No. 739,453. Patented September 22, 1903.

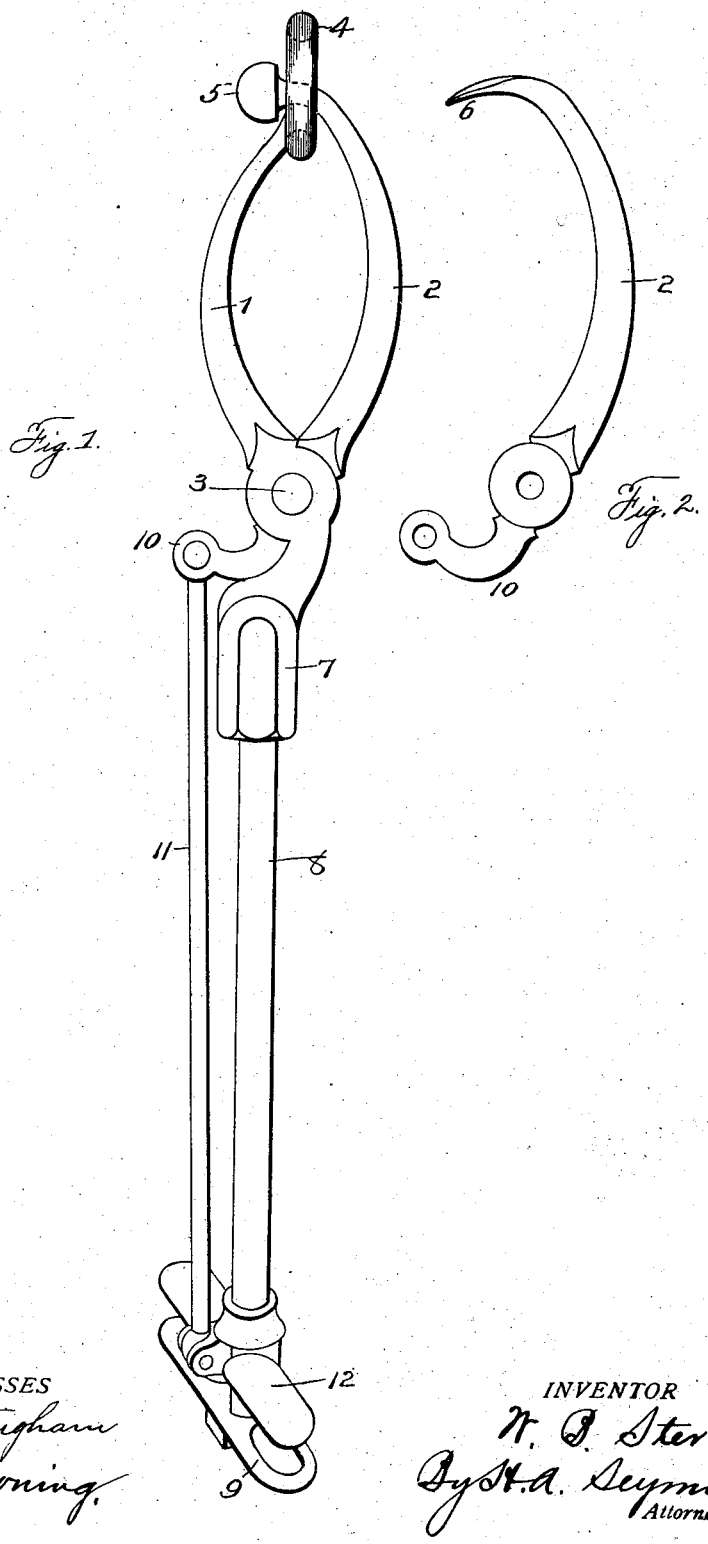

UNITED STATES PATENT OFFICE.

WILLIAM B. STEVENS, OF ST. MARYS, CANADA.

VETERINARY FORCEPS.

SPECIFICATION forming part of Letters Patent No. 739,453, dated September 22, 1903.

Application filed July 19, 1902. Serial No. 116,218. (No model.)

*To all whom it may concern:*

Be it known that I, WILLIAM B. STEVENS, veterinary surgeon, of the town of St. Marys, in the county of Perth and Province of Ontario, Canada, have invented a new and useful Parturition-Forceps for the Use of Veterinary Surgeons and others, of which the following is a specification.

My invention relates to an improvement in parturition-forceps, and more particularly to such as are adapted for use by veterinary surgeons.

The object of my invention is to provide an instrument with the use of which danger of injury to the animal or the operator during obstetrical operations upon young animals will be prevented.

A further object is to so construct forceps for veterinary use that they can be operated in the least possible space and so that they will not unduly stretch the vagina or parts with which they come in contact.

A further object is to provide forceps which can be firmly gripped by the surgeon, which can be easily operated, which shall be fully under the control of the operator, and which shall be effectual in all respects in the performance of their functions.

With these objects in view the invention consists in certain novel features of construction and combinations and arrangements of parts, as hereinafter set forth, and pointed out in the claims.

In the accompanying drawings, Figure 1 is an elevation showing forceps embodying my invention. Fig. 2 is a detail of a jaw having a pointed end.

1 2 represent two curved jaws, which when closed form an oval figure. These jaws are pivotally connected together at 3, and the jaw 1 is provided at its free end with an enlargement 4, having an opening through which the free end of the other jaw 2 passes. The free end of the jaw 2 may be provided with a spherical enlargement 5, as shown in Fig. 1, or it may have a pointed end, as shown at 6, Fig. 2, or both constructions may be provided and used interchangeably, as occasion my require, it being simply necessary to remove one jaw 2 and replace it with the other.

The jaw 1, which may be termed the "fixed" jaw, is provided below the pivot 3 with a socket-piece 7 for the reception of a bar 8, the lower end of which is provided with a fixed handle or handpiece 9. The movable jaw 2 is provided below the pivot 3 with a laterally-projecting arm 10, to the free end of which a rod 11 is pivoted. The other end of the rod 11 is pivotally attached to a handle 12, mounted to slide on the bar 8.

From the construction and arrangement of parts above described it will be seen that the perforated end of the jaw 1 will serve to prevent the other jaw, whether pointed or not, from lacerating vagina or other parts of the animal being operated upon. If it should happen that the forceps should lose their hold or grip and break away from the hold upon the young animal, no damage would be done to the animal or the operator. The instrument is operated by pressing the handles apart, thus forcing the jaws apart, and by reversing the pressure on the handles the jaws will be closed.

Having fully described my invention, what I claim as new, and desire to secure by Letters Patent, is—

1. In veterinary forceps, the combination with two jaws pivotally connected together, of a bar rigidly secured to one of said jaws, a handle mounted to slide on said bar, and a rod connecting said handle with the other jaw.

2. In veterinary forceps, the combination with two jaws pivotally connected together, of a bar rigidly secured to one of said jaws, a fixed handle on said bar, an arm projecting from the other jaw, a sliding handle on the bar and a rod connecting said arm and sliding handle.

3. In veterinary forceps, the combination with a bar and a jaw fixed to said bar and provided at its free end with an enlargement having an opening therein, of a pivoted jaw adapted at its free end to project through the opening in the fixed jaw, a handle mounted to slide on said bar, an arm projecting from the pivoted jaw and a rod connecting said arm with the sliding handle.

4. In veterinary forceps, the combination with two curved jaws pivotally connected together, one of said jaws having an opening at its free end and the other jaw having a spherical enlargement to pass through said opening, of a bar fixed to one of said jaws, an arm on the other jaw, a sliding handle on the bar and a rod connecting said arm and handle.

Dated at the town of St. Marys, in the county of Perth and Province of Ontario, Canada, this 5th day of July, 1902.

W. B. STEVENS.

Witnesses:
LEONARD HARSTONE,
A. W. FORD.